United States Patent [19]

Fischer

[11] Patent Number: 4,712,715
[45] Date of Patent: * Dec. 15, 1987

[54] DEVICE FOR INJECTING A FIXING AGENT INTO A DRILLED HOLE FOR ANCHORING A FASTENING ELEMENT INSERTED IN A DRILLED HOLE

[76] Inventor: Artur Fischer, Weinhalde 34, D-7244 Tumlingen/Waldachtal 3, Fed. Rep. of Germany

[*] Notice: The portion of the term of this patent subsequent to Sep. 2, 2003 has been disclaimed.

[21] Appl. No.: 882,636

[22] Filed: Jul. 7, 1986

[30] Foreign Application Priority Data

Jul. 6, 1985 [DE] Fed. Rep. of Germany ....... 3524289

[51] Int. Cl.$^4$ .................. B65D 25/40; B67C 3/02
[52] U.S. Cl. ..................... 222/145; 222/319; 222/386; 222/573; 206/219; 604/231; 604/56; 52/173 R
[58] Field of Search ........... 222/129, 319, 386, 386.5, 222/573, 143, 160, 541, 145; 604/231, 203, 82, 87, 92, 56, 416; 141/27; 206/219; 52/173 R

[56] References Cited

U.S. PATENT DOCUMENTS

| | | | |
|---|---|---|---|
| 714,212 | 11/1902 | Marks | 222/386 X |
| 1,238,403 | 8/1917 | Hellein | 222/386 X |
| 2,252,115 | 8/1941 | Brue | 222/386 X |
| 2,763,405 | 9/1956 | Shvetz | 222/386 X |
| 3,144,966 | 8/1964 | Cook | 222/136 |
| 3,266,671 | 8/1966 | Gelpey | 222/94 |
| 3,735,900 | 5/1973 | Gores | 604/82 |
| 3,906,947 | 9/1975 | Cloyd | 604/231 |
| 3,924,741 | 12/1975 | Kachur et al. | 604/92 X |
| 4,050,612 | 9/1977 | Stone | 604/231 X |
| 4,062,477 | 12/1977 | Morane | 222/145 |
| 4,116,354 | 9/1978 | Kenkare et al. | 206/219 X |
| 4,308,977 | 1/1982 | Sigmund et al. | 222/320 |
| 4,609,129 | 9/1986 | Fischer | 222/386 X |

FOREIGN PATENT DOCUMENTS

| | | |
|---|---|---|
| 1969045 | 9/1967 | Fed. Rep. of Germany . |
| 2737591 | 2/1979 | Fed. Rep. of Germany . |
| 8003936 | 2/1980 | France ................ 206/219 |
| 1035820 | 7/1966 | United Kingdom ...... 206/219 |

Primary Examiner—Joseph J. Rolla
Assistant Examiner—Gregory L. Huson
Attorney, Agent, or Firm—Michael J. Striker

[57] ABSTRACT

A device for injecting a fixing agent for anchoring a fastening element in a drilled hole comprises a sealable container which contains one component of the fixing agent, an injection nozzle, and a plunger which can be pushed into the container. The injection nozzle is arranged on the plunger and the total length of the plunger and the injection nozzle corresponds at least to the depth of the inner space in the container. Around the injection nozzle is provided a sleeve which starts from the base of the plunger. The sleeve is filled with a further component of the fixing agent. The open end face of the sleeve is sealed by a cover having a frangible opening.

3 Claims, 2 Drawing Figures

DEVICE FOR INJECTING A FIXING AGENT INTO A DRILLED HOLE FOR ANCHORING A FASTENING ELEMENT INSERTED IN A DRILLED HOLE

BACKGROUND OF THE INVENTION

The present invention relates to a device for injecting a fixing agent for anchoring a fastening element in a drilled hole. Devices of the foregoing type comprise a container which contains one component of the fixing agent and can be sealed, and an injection nozzle combined with a plunger which can be moved into the container.

Such a device has been disclosed in applicant's allowed patent application Ser. No. 668,077 now U.S. Pat. No. 4,609,129.

In the disclosed device, the injection nozzle is arranged on the plunger, and the total length of the plunger and the injection nozzle corresponds at least to the depth of the inner space in the container.

The second component of the fixing agent is accommodated in a cap-shaped cavity of the plunger. Water must be poured into the cavity before operation.

A holding force of conventional fastening elements is constituted on an expansible portion of the fastening element wedged in the drilled hole, for example by screwing of a fastening screw. As a result of expansion, however, stresses are produced, which allow only low holding forces, especially in porous and soft masonry. Fastening elements that can be anchored in a stress-free manner by the injection of a fixing agent around them have proved especially suitable for such materials. In a known anchoring process of this type, the fixing agent, for example a cement mixture, after being preliminarily mixed is poured into an injection device and by means of this device is then injected into the drilled hole. For a single mounting operation, however, the provision of such an injection device is generally not worthwhile. Furthermore, a further vessel is required for the preparatory mixing of the fixing agent. Both the injection device and this further vessel must be cleaned immediately after use or, in the case of a series of mounting operations, at short, regular intervals, to prevent the apparatus from becoming clogged and thus unusable.

DE-OS No. 27 30 110 discloses a container for once-only use. However, this container is still very expensive to manufacture. Handling this container also presents problems since a rod-shaped accessory element is necessary to press in the piston. DE-OS No. 33 41 283 discloses a container for once-only use, with which it is possible to inject the fixing agent, which is prepared by mixing inside the container, without the use of additional accessories. The container contains only one component, however, whereas the other component, which in the case of a cement mixture will be water, must be added using the plunger which is a beaker-like construction.

SUMMARY OF THE INVENTION

It is an object of the present invention to provide an improved device for injecting a fixing agent into a drilled hole for anchoring a fastening element in that hole.

It is a further object of the invention to provide an injecting device in which the components of the fixing agent would be accommodated.

It is yet another object of the invention to provide a device for injecting a fixing agent, which is easy to handle.

These and other objects of the invention are attained by a device for injecting a fixing agent into a drilled hole for anchoring a fastening element inserted in said hole, comprising a vessel filled with one component of the fixing agent and sealingly closable with sealing means; a plunger; and an injection nozzle mounted on said plunger, said plunger and said injection nozzle having an overall length which matches a height of an interior of said vessel, said plunger including a sleeve surrounding said nozzle and starting from a base of said plunger, said sleeve being filled with another component of said fixing agent and having an end face, said end face being sealed with a cover having a frangible opening, said plunger with said sleeve and said nozzle being movable into said vessel, whereby, upon piercing of said frangible opening, said another component is poured from said sleeve into said vessel filled with said one component and mixed to form in said vessel a mixture of said one another component prior to mounting said plunger-sleeve-nozzle combination on said vessel so that the mixture is discharged from said vessel through said nozzle toward said fastening element as pressure is applied to said vessel against said plunger and injection nozzle.

The capacity of said sleeve may be matched to a predetermined quantity of said component introduced into said vessel in accordance with a mixing ratio.

Said opening of the sleeve cover may be sealed by a sprayed-on skin.

The vessel may be formed of an impregnated cardboard or sheet metal.

The other component, which in the case of a cement mixture will be water, is accommodated in the sleeve which is arranged around the injection nozzle and is sealed with a cover. After the opening, provided in the cover, has been broken open, the water is poured into the opened vessel and the two components are mixed with one another by stirring. After the mixture has been mixed, the plunger provided with the injection nozzle is placed onto the opening of the vessel and the nozzle is positioned at the injection opening of the fastening element. Pressure on the base of the vessel forces the plunger into the vessel and presses the mixture through the injection nozzle into the drilled hole.

Due to a predetermined capacity of the sleeve the mixing ratio is thus always correct, so that the optimal properties of the fixing agent are achieved. This renders the anchoring operation easier, even for an non-trained person.

The sprayed-on skin can easily be pierced with a screwdriver, nail or the like thus making the operation very easy.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
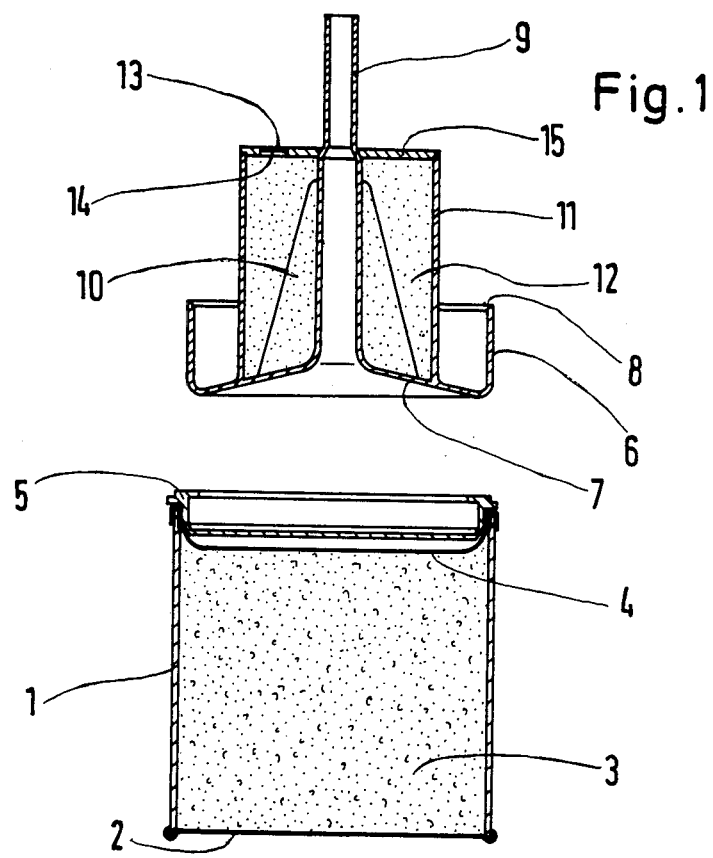
FIG. 1 is an exploded sectional view of the plunger nozzle and the vessel of the fastening element, according to the invention.
Figure 2:
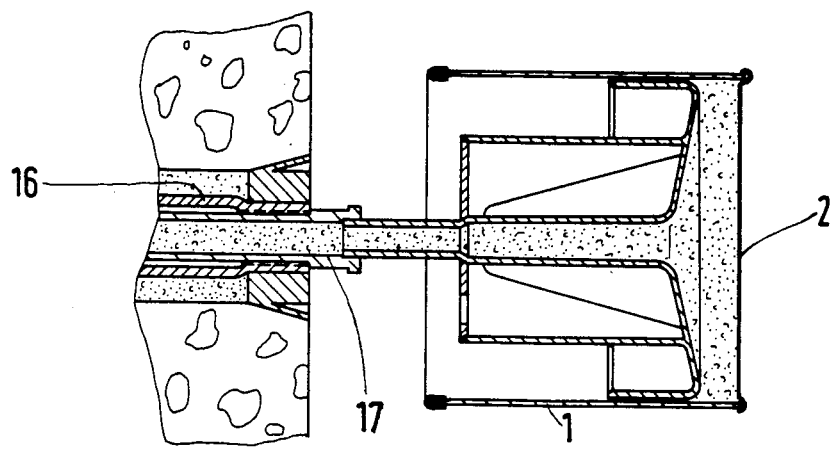
FIG. 2 is a sectional view of the fastening element inserted into a borehole in the masonry after the injection.

Referring to the drawings in detail, reference numeral designates a container or vessel made of impregnated cardboard or sheet metal. The container or vessel 1 is constructed in the form of a bowl-shaped hollow cylinder having a base 2. After vessel 1 has been filled with a one component 3 of the fixing agent, it is sealed by a tear film 4 and/or, if required, by a plastic cover 5. The fastening device further includes a plunger 6, a base 7 of which has an injection nozzle 9, which projects upwardly beyond the edge 8 of the piston 6. In order to stabilize the injection nozzle 9, which is manufactured integrally with the plunger 6 in an injection-molding process, ribs 10 are provided, which are connected to the base 7 of the plunger 6. Around the injection nozzle 9, is arranged a sleeve 11 which starts from the base 7 of the plunger 6 and is filled with a further agent or component 12 of the fixing agent, generally water. The capacity of the sleeve 11 is matched to the amount of component 3 contained in the container or vessel 1 in accordance with the optimal mixing ratio. Sleeve 11 in turn has a cover 15 formed with an opening 14 sealed by means of a sprayed-on skin 13. Cover 15 has been placed into the end face of sleeve 11 and bonded.

To carry out the anchoring operation, sleeve 11 with the injection nozzle is placed over the vessel 1, then the opening 14, which has been sealed by the sprayed-on skin 13, is pierced, for example with a pointed object, and the water is emptied into the preliminarily opened vessel 1. After mixing the component 3 with water by means of stirring, shaking or the like, the plunger 6 is placed onto the opening in the container 1, and the injection nozzle 9 is positioned at the filling opening of a fastening element 16. By means of pressure applied to the base 2 of the container 1 the cement mixture is injected through the injection nozzle 9 and a sleeve 17, which has been inserted into the fastening element 16, into the drilled hole. During the injection operation, the container 1 is moved in the direction towards the surface of the masonry, whilst the plunger 6 with the injection nozzle 9 is supported against the fastening element 16.

It will be understood that each of the elements described above, or two or more together, may also find a useful application in other types of injecting devices differing from the types described above.

While the invention has been illustrated and described as embodied in an injecting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a device for injecting a fixing agent into a drilled hole for anchoring a fastening element inserted in said hole, a combination comprising a vessel filled with one component of the fixing agent and sealingly closable with sealing means; a plunger; and an injection nozzle mounted on said plunger, said plunger and said injection nozzle having an overall length which matches a height of an interior of said vessel, the improvement comprising said plunger including an elongated cylindrical sleeve surrounding said nozzle and radially spaced therefrom, said sleeve starting from a base of said plunger and extending along an axis of said nozzle over a substantial portion of a length of said nozzle so as to form between a wall of said sleeve and a wall of said nozzle an annular space filled with another component of said fixing agent, said sleeve having an end face, said end face being sealed with a cover closing said space and having a frangible opening, said plunger with said sleeve and said nozzle being movable into said vessel whereby upon piercing of said frangible opening, said another component from said sleeve is admitted into said vessel filled with said one component and is mixed with said one component to form in said vessel a mixture of said one and another component prior to mounting said plunger-sleeve-nozzle combination on said vessel so that the mixture is discharged from said vessel through said nozzle toward said drilled hole as pressure is applied to said vessel against said plunger and injection nozzle.

2. The device as defined in claim 1, wherein the capacity of said sleeve is matched to a predetermined quantity of said component introduced into said vessel in accordance with a mixing ratio.

3. The device as defined in claim 1, wherein said opening is sealed by a sprayed-on skin.

* * * * *